No. 886,172. PATENTED APR. 28, 1908.
J. W. BEVANS.
EDUCATIONAL DEVICE.
APPLICATION FILED APR. 30, 1907. RENEWED MAR. 30, 1908.
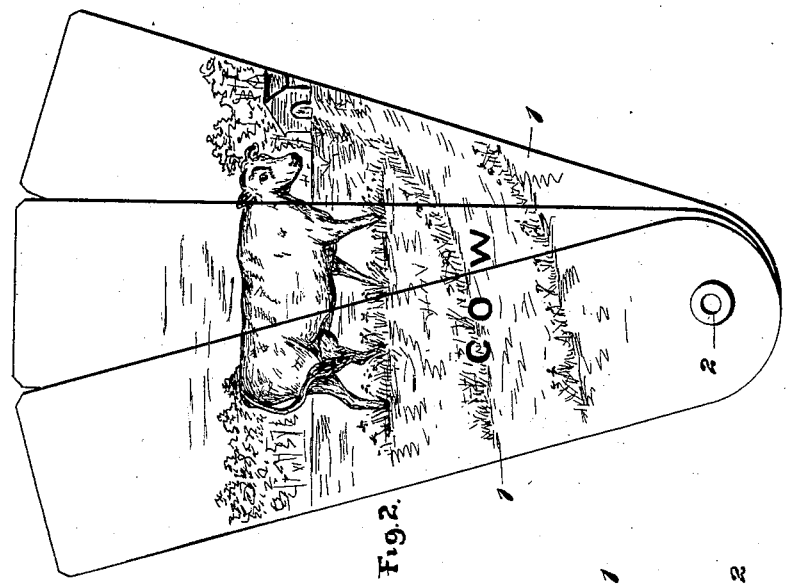
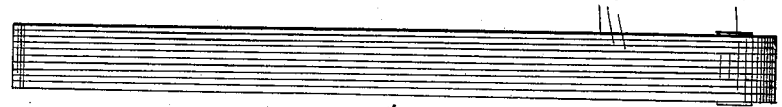
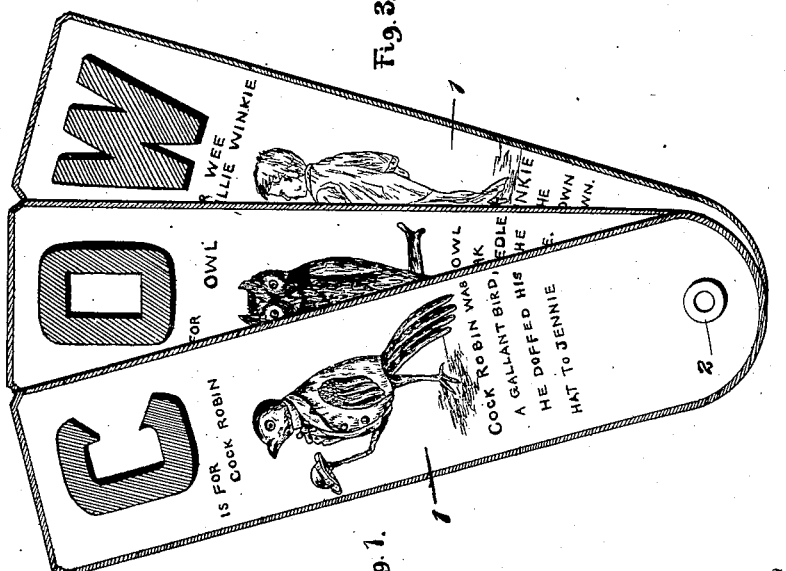
Witnesses
Inventor

UNITED STATES PATENT OFFICE.

JAMES W. BEVANS, OF GARRETT PARK, MARYLAND.

EDUCATIONAL DEVICE.

No. 886,172.  Specification of Letters Patent.  Patented April 28, 1908.

Application filed April 30, 1907, Serial No. 371,119. Renewed March 30, 1908. Serial No. 424,156.

*To all whom it may concern:*

Be it known that I, JAMES W. BEVANS, a citizen of the United States, residing at Garrett Park, in the county of Montgomery and State of Maryland, have invented certain new and useful Improvements in Educational Devices, of which the following is a specification.

This invention relates to improvements in educational devices, and the object is to provide a simple and improved device by means of which the alphabet may be taught, together with the formation of words, objects, etc.

With the above objects in view, the invention consists in the novel features of construction hereinafter fully described, particularly pointed out in the claims, and clearly illustrated by the accompanying drawing, in which Figure 1 is a view of the invention showing one of the combinations which may be formed; Fig. 2, a view of the reverse side showing one of the animals completed, and Fig. 3, an edge view of the device.

My invention consists in providing a number of sections or plates 1 pivoted together by a common pivot 2, and not connected with each other in any way other than by said pivot.

Each section carries upon one face, a portion of a representation, that is, a part of a word, namely, a letter of the alphabet, there being one section or plate for each letter of the alphabet. Placed below the letter is a complete pictorial representation designed to be indicated by said letter, and, as shown in the drawing, a verse referring to the pictorial representation.

Each section on its reverse side also carries a portion of a representation, shown in the present instance, as a portion of an animal. I have shown the portions of the animals so arranged with respect to the letters of the alphabet on the reverse side of the sections, that when the sections bearing the proper letters of a word indicating an animal are brought into position to spell the word, the animal will appear complete on the opposite face of the series of sections employed in spelling the name.

From the above description it will be seen that I have provided an educational device which is in the form of a book having pivoted leaves, and by means of which the alphabet, the spelling of words and the formation of animals and objects with their names, may be taught.

Under the term "representation," I include words, pictures of animals, scenes, buildings and objects, or in fact any thing that can be placed in parts upon the leaves or sections 1 and completed by bringing the proper sections into co-relation.

Having thus fully described my invention, what I claim as new, and desire to secure by Letters Patent of the United States, is:

1. An educational device comprising a plurality of sections pivoted together by a common pivot and not connected with each other in any way other than by the pivot, each section having thereon a letter of the alphabet and a pictorial representation designed to be indicated by said letter.

2. An educational device comprising a plurality of sections pivoted together at one end and each carrying a portion of an object and a letter of the alphabet, the letters and portions of objects being so arranged that when some of the sections have been brought together to form a complete object, the letters on these sections will spell the name of the object.

3. An educational device comprising a plurality of sections pivoted together at one end and each carrying upon one face a portion of an object and on the other face a letter of the alphabet and a complete object designed to be indicated by said letter, the portions of the object and the letters being so arranged that when some of the sections have been brought together to spell the name of the object the latter will appear complete upon the reverse side of the sections thus assembled.

4. A device of the character described comprising a plurality of sections pivoted together at one end and not connected with each other in any way other than by said pivot, each section carrying a portion of a representation, the sections being so arranged that they may be moved into position to form a complete representation.

In testimony whereof I affix my signature in presence of two witnesses.

JAMES W. BEVANS.

Witnesses:
  W. H. BEVANS,
  KENNETH P. CLARKE.